US011606487B2

United States Patent
Kawase

(10) Patent No.: US 11,606,487 B2
(45) Date of Patent: Mar. 14, 2023

(54) ELECTRONIC APPARATUS

(71) Applicant: CANON KABUSHIKI KAISHA, Tokyo (JP)

(72) Inventor: Satoshi Kawase, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/563,677

(22) Filed: Dec. 28, 2021

(65) Prior Publication Data

US 2022/0217251 A1 Jul. 7, 2022

(30) Foreign Application Priority Data

Jan. 5, 2021 (JP) .............................. JP2021-000390

(51) Int. Cl.
*H04N 5/225* (2006.01)

(52) U.S. Cl.
CPC ................................ *H04N 5/2253* (2013.01)

(58) Field of Classification Search
CPC .......................... H04N 5/2253; H04N 5/22521
See application file for complete search history.

(56) References Cited

U.S. PATENT DOCUMENTS

| 2010/0151192 A1* | 6/2010 | Saito | H01L 27/14618 |
| | | | 428/137 |
| 2013/0076975 A1* | 3/2013 | Kumoi | H04N 5/23209 |
| | | | 348/373 |
| 2013/0107114 A1* | 5/2013 | Tobinaga | H04N 5/2253 |
| | | | 348/374 |
| 2020/0137271 A1* | 4/2020 | Sugino | H04N 5/23287 |

FOREIGN PATENT DOCUMENTS

JP          6675241 B2      4/2020

* cited by examiner

*Primary Examiner* — Mekonnen D Dagnew
(74) *Attorney, Agent, or Firm* — Cowan, Liebowitz & Latman, P.C.

(57) ABSTRACT

An electronic apparatus includes a substrate having a first surface on which a semiconductor element is mounted and a holding member configured to adhere to a second surface of the substrate which is a surface opposite to the first surface and to hold the substrate. The second surface of the substrate includes a first region to which the holding member is fixed via an adhesive, a second region in which a conductive portion that conducts heat of the semiconductor element from the first surface to the second surface of the substrate is disposed, and a third region at which a portion of the holding member and the substrate come into contact with each other. The second region is provided between the first region and the third region in a plane direction of the second surface.

10 Claims, 11 Drawing Sheets

ELECTRONIC APPARATUS

BACKGROUND OF THE INVENTION

Field of the Invention

The present invention relates to an electronic apparatus having a substrate on which a semiconductor element is mounted.

Description of the Related Art

For example, in an imaging apparatus such as a single-lens type digital camera, in order to reduce the size and thickness, a reflex mirror that guides a luminous flux from a subject which is obtained through an imaging optical system to a finder optical system may not be included. In this type of imaging apparatus, a display unit provided in the imaging apparatus functions as a finder, an image pickup device is constantly driven to perform image processing, and a live view image is displayed on the display unit.

Therefore, in an imaging apparatus without a reflex mirror, a period of time during which heat is generated from an image pickup device or an IC for image processing is longer than that of an imaging apparatus with a reflex mirror. As an effect of the heat on the image pickup device, deterioration of image quality due to an increase in signal noise of the image pickup device is generally known.

In order to avoid the above phenomenon, for example, a technique in which a heat absorbing part is provided on a substrate on which an image pickup device is mounted and a heat dissipation member is brought into contact with the heat absorbing part to efficiently dissipate the heat of the image pickup device to the outside is proposed (see, for example, Japanese Patent No. 6675241).

However, in the technique disclosed in Japanese Patent No. 6675241 described above, a side surface of a package of the image pickup device adheres to a holder to dissipate the heat. Therefore, heat dissipation performance of the image pickup device which is a semiconductor element deteriorates via an adhesive which is a non-metal material.

SUMMARY OF THE INVENTION

An electronic apparatus, which is an example of the present invention, includes a substrate having a first surface on which a semiconductor element is mounted and a holding member configured to adhere to a second surface of the substrate which is a surface opposite to the first surface and to hold the substrate. The second surface of the substrate includes a first region to which the holding member is fixed via an adhesive, a second region in which a conductive portion that conducts heat of the semiconductor element from the first surface to the second surface of the substrate is disposed, and a third region at which a portion of the holding member and the substrate come into contact with each other. The second region is provided between the first region and the third region in a plane direction of the second surface.

Further features of the present invention will become apparent from the following description of exemplary embodiments with reference to the attached drawings.

DESCRIPTION OF THE EMBODIMENTS

Figure 1:
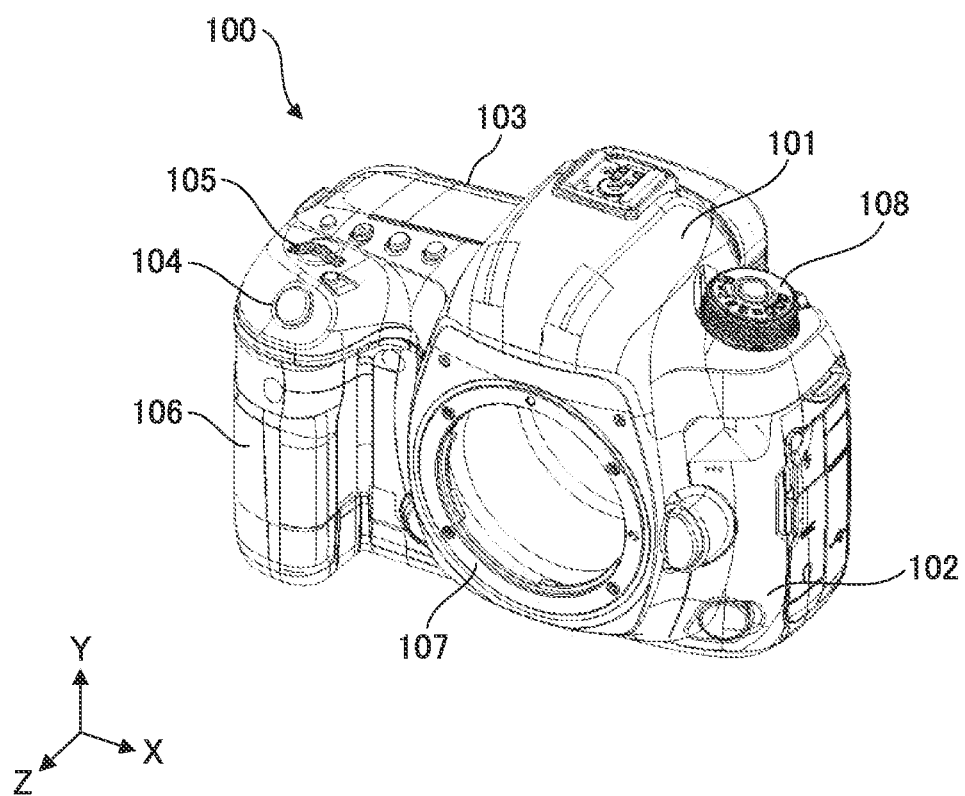
FIG. 1 is an external perspective view of a camera toward a front surface side thereof.

Hereinafter, an example of embodiments of the present invention will be described with reference to the drawings. In each figure, the same reference signs are assigned to identical elements and overlapping description is omitted. Shapes, dimensions, and the like of each element shown in the drawings are schematically shown and do not indicate actual shapes, dimensions, and the like.

Further, in the drawings, an XYZ coordinate system is shown as a three-dimensional orthogonal coordinate system as appropriate. In the XYZ coordinate system, a Z direction is a direction parallel to an optical axis OA which will be described later. An X direction is a direction orthogonal to the Z direction and corresponds to a substantially left-right direction in FIG. 1. A Y direction is a direction orthogonal to both the X direction and the Z direction and corresponds to a vertical direction in FIG. 1.

FIG. 1 is an external perspective view of a camera 100 toward a front surface side thereof.

The camera 100 is an example of an electronic apparatus and is covered with an upper surface cover 101, a front surface cover 102, and a rear surface cover 103, which are exterior members. The upper surface cover 101 is provided with a release button 104, an electronic dial 105, a grip 106, a mount 107, and a mode dial 108.

The release button 104 is a button that receives an imaging instruction for the camera 100. When an operation of pressing the release button 104 is received, the camera 100 drives each part to execute an imaging operation. The electronic dial 105 is an operation member that receives an input of an imaging setting of the camera 100. Arbitrary imaging parameters such as an exposure setting can be set with an operation of the electronic dial 105. The grip 106 is a portion at which a user grips the camera 100 when a subject is imaged. A lens (not shown) is attached to the mount 107. The mode dial 108 is an operation member that receives an operation for changing an imaging mode. After imaging conditions of the camera 100 are set via the above operation member, the user captures a moving image or a still image with the camera 100.

Next, an internal structure of the camera 100 will be described.

Figure 2:
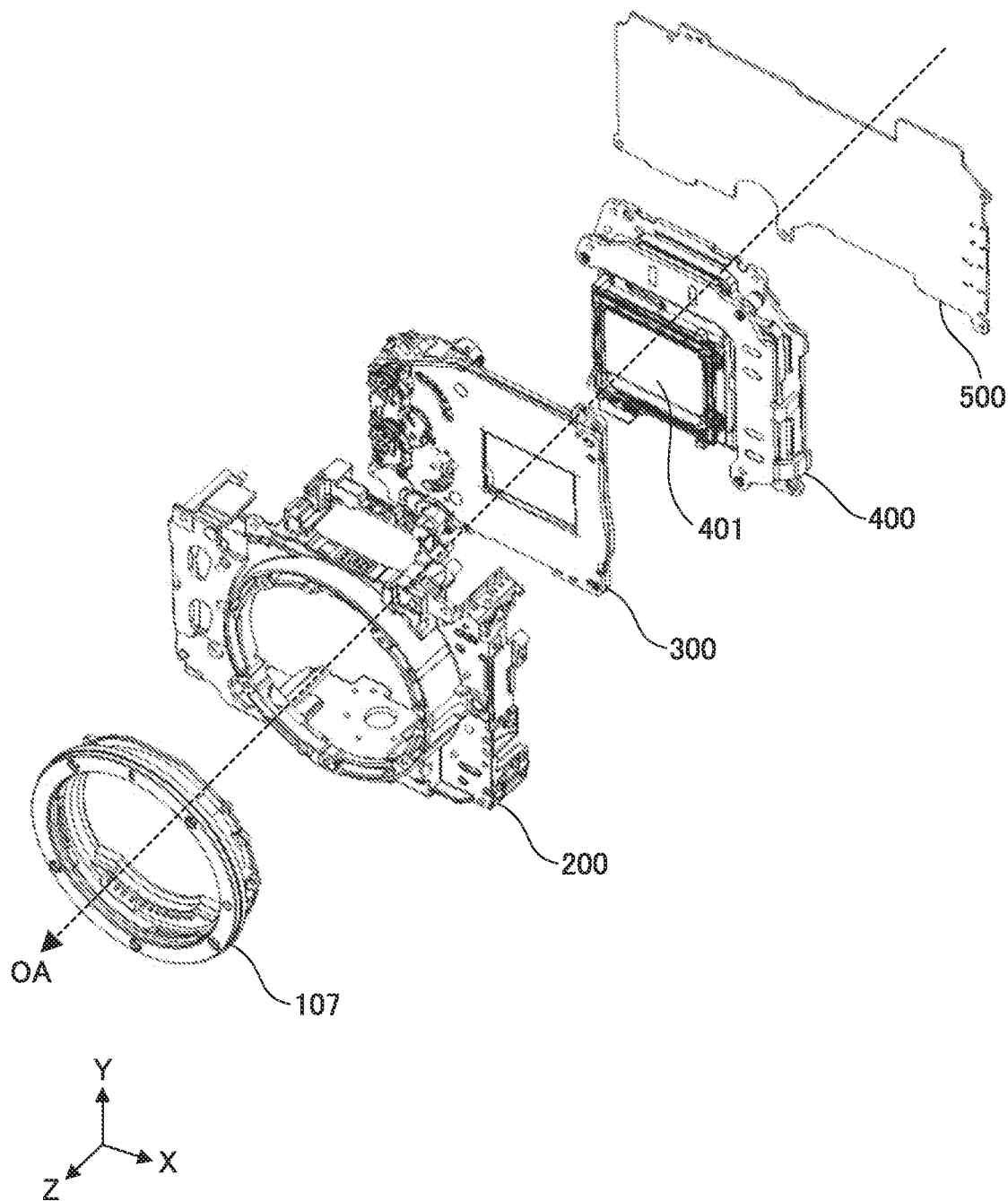
FIG. 2 is an exploded perspective view of the camera toward the front surface side thereof with exterior members removed.
Figure 3:
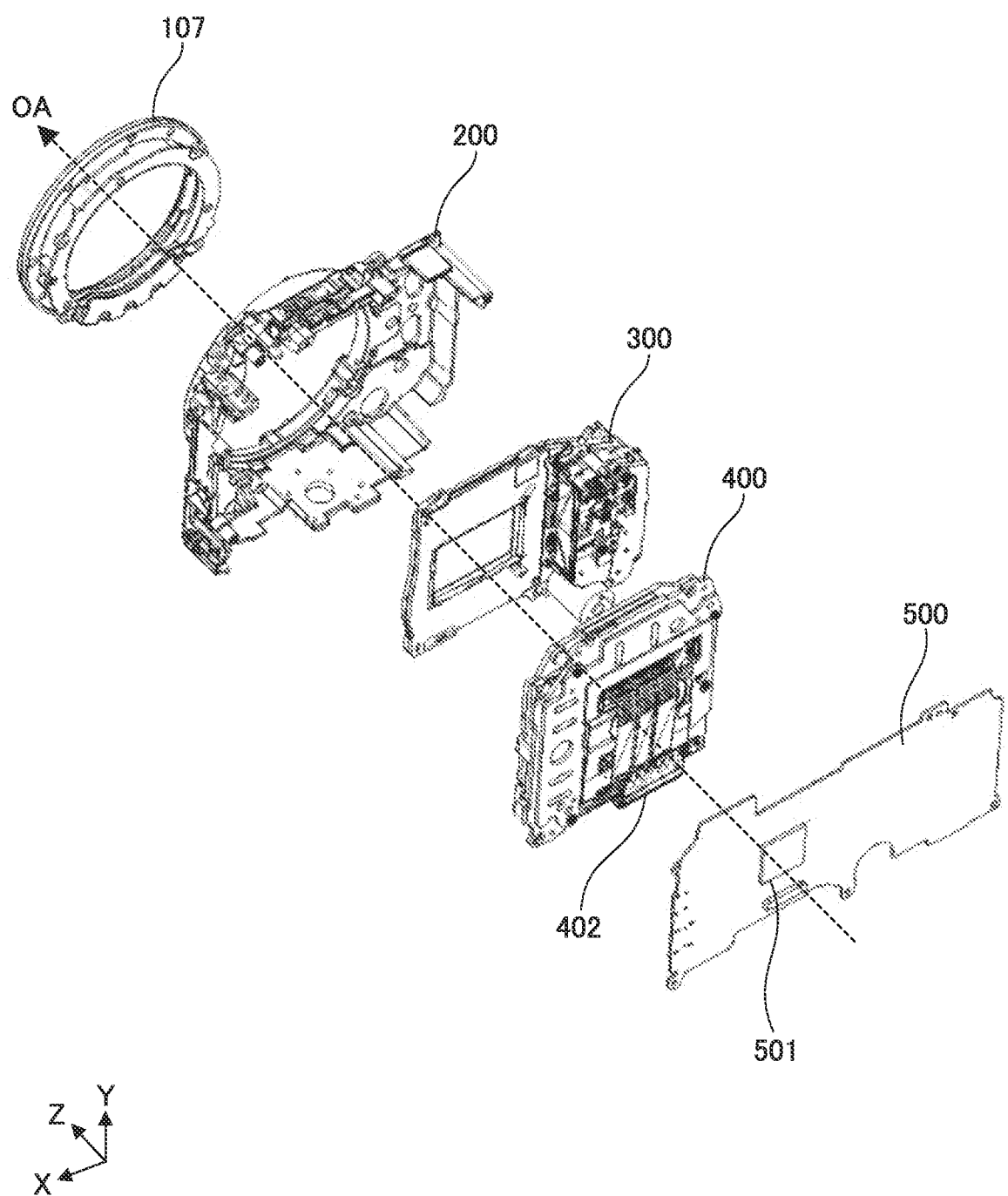
FIG. 3 is an exploded perspective view of the camera toward a rear surface side thereof with exterior members removed.

FIG. 2 is an exploded perspective view of the camera 100 toward a front surface side thereof with exterior members removed. FIG. 3 is an exploded perspective view of the camera 100 toward a rear surface side thereof with exterior members removed.

The mount 107, a main base 200, a shutter unit 300, an imaging unit 400, and a control substrate 500 are arranged inside the camera 100 in that order from the front surface side to the rear surface side of the camera 100.

The main base 200 is a member that serves as a skeleton of the camera 100 and is formed of a material such as a resin. The shutter unit 300 is a light-shielding member used for exposure control of the imaging unit 400 and is fixed to the main base 200 with screws (not shown) or the like.

The imaging unit 400 includes an image pickup device 401 for capturing an image of a subject on a front surface side of the imaging unit 400. The imaging unit 400 is fixed in the camera 100 after being adjusted such that an imaging surface of the image pickup device 401 is parallel to the mount 107 with a predetermined interval therebetween. Further, the imaging unit 400 is electrically connected to the control substrate 500 via a flexible printed wiring substrate 408 on a rear surface side of the imaging unit 400. As a result, the image of the subject formed on the imaging surface is converted into an electric signal by the image pickup device 401, and the electric signal is transmitted to the control substrate 500 via the flexible printed wiring substrate 408.

The control substrate 500 has an image processing IC 501 that performs various image processing. The control substrate 500 converts the electric signal output from the flexible printed wiring substrate 408 into an image and presents the image to the user via, for example, a liquid crystal display device (not shown).

Figure 4:
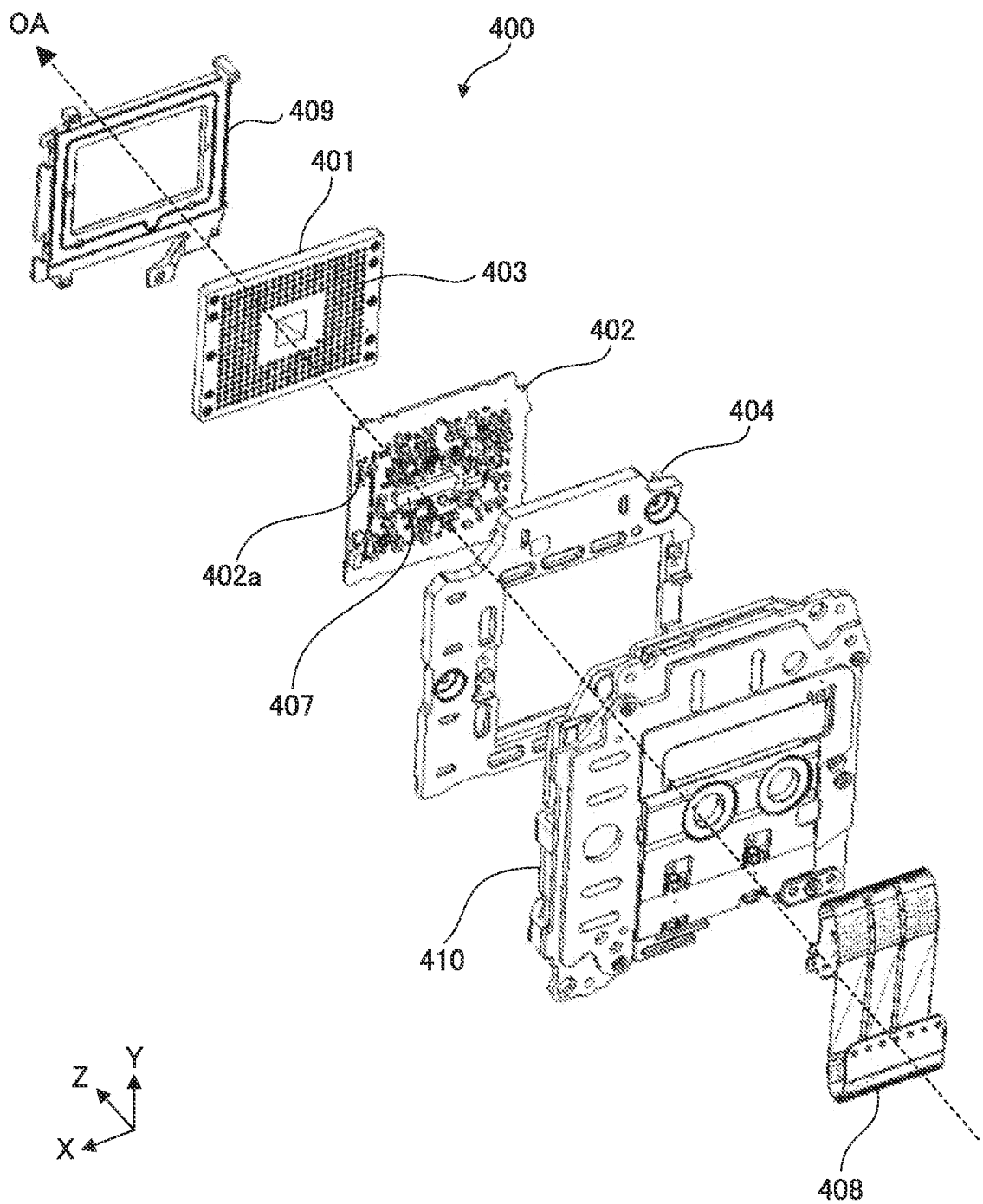
FIG. 4 is an exploded perspective view of an imaging unit toward a rear surface side thereof.

FIG. 4 is an exploded perspective view of the imaging unit 400 toward a rear surface side thereof.

The imaging unit 400 includes an optical filter part 409 and the image pickup device 401. The optical filter part 409 is disposed on a front surface side of the image pickup device 401 and includes, for example, an optical low-pass filter or the like. The optical filter part 409 may be provided with a piezoelectric element for removing dust and the like adhering to a filter surface by vibration.

The image pickup device 401 has a photoelectric converter (not shown) in which a plurality of pixels are arranged in a plane direction of the imaging surface and is mounted on the imaging substrate 402. Each pixel of the photoelectric converter includes a photodiode that detects light and generates an electric charge or the like. Further, the image pickup device 401 has electrode pads 403 on a rear surface side which is a back surface of a subject side. The electrode pads 403 are electrically connected to the photoelectric converter of the image pickup device 401.

The image pickup device 401 of the present embodiment is, for example, a CMOS image sensor, but is not limited to this, and may be another image pickup device such as a CCD.

The imaging substrate 402 is electrically connected to the photoelectric converter of the image pickup device 401 via the electrode pads 403 and receives an electric signal from the image pickup device 401. Various electronic components 402a such as a capacitor to be mounted on the imaging substrate 402 and a connector 407 to be electrically connected to the flexible printed wiring substrate 408 are mounted on a rear surface side of the imaging substrate 402.

The imaging unit 400 of the present embodiment has a lead less chip carrier (LLCC) type structure in which the electrode pads 403 are provided on a back surface of the image pickup device 401 and a lead is not exposed to the outside of the image pickup device 401. Instead of the LLCC type structure, for example, a cerdip type structure in which a lead is interposed between ceramic plates, a gap is formed between the image pickup device 401 and the imaging substrate 402 and the lead is soldered between the image pickup device 401 and the imaging substrate 402 may be employed for the imaging unit 400.

The imaging substrate 402 is held by a holding member 404. Further, a blur correction part 410 that performs blur correction by translating or rotating the holding member 404 holding the image pickup device 401 and the imaging substrate 402 on the XY plane is disposed on a rear surface side of the holding member 404.

Here, the holding member 404 is formed of a metal material. As a result, heat of the imaging substrate 402 on which the image pickup device 401 is mounted is easily transferred to the holding member 404 that is in contact with the imaging substrate 402, and an effect of reducing the heat of the image pickup device 401 is easily obtained.

Next, a method of fixing the imaging substrate 402 will be described.

Figure 5:
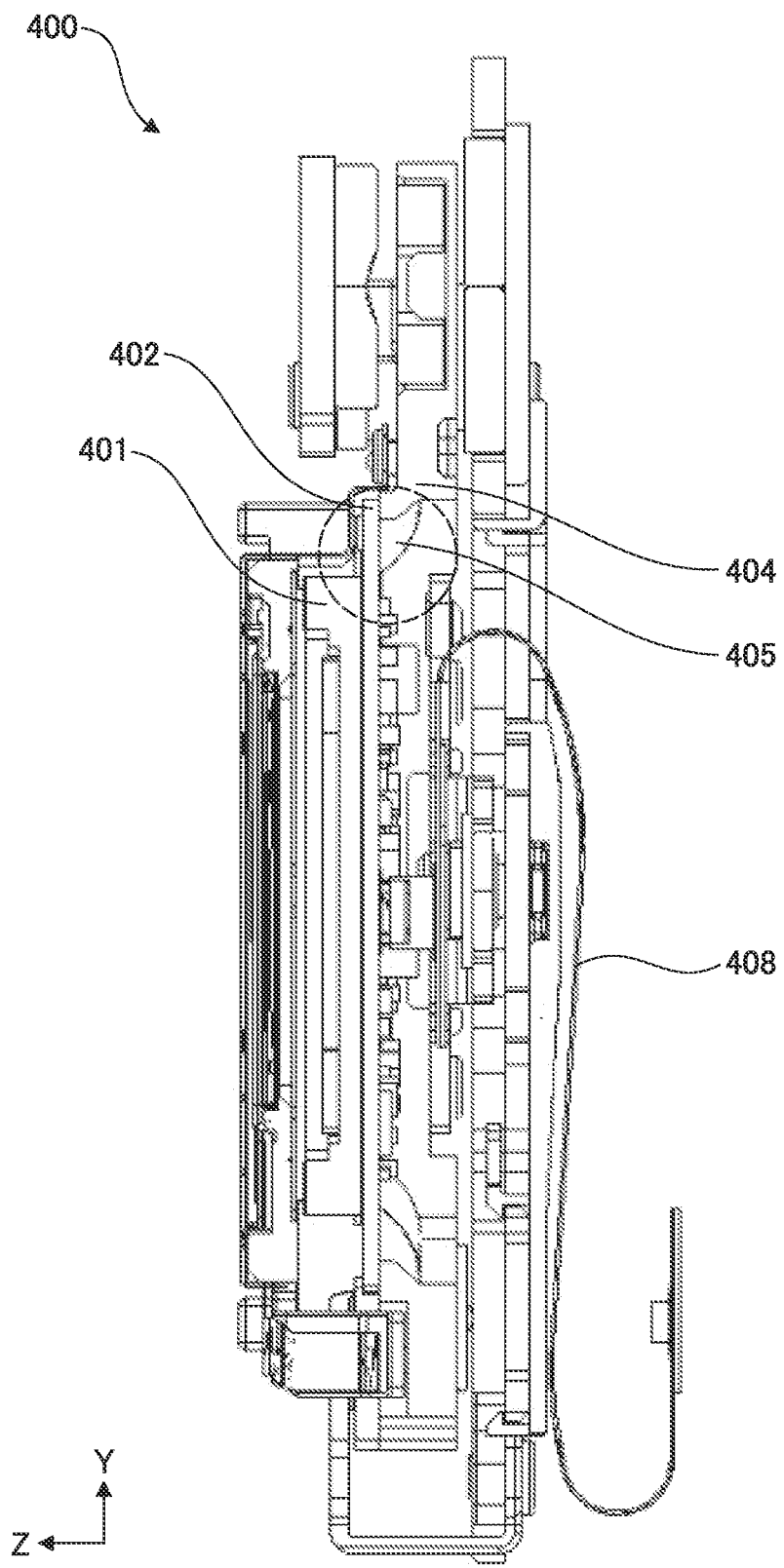
FIG. 5 is a vertical cross-sectional view of the imaging unit.
Figure 6:
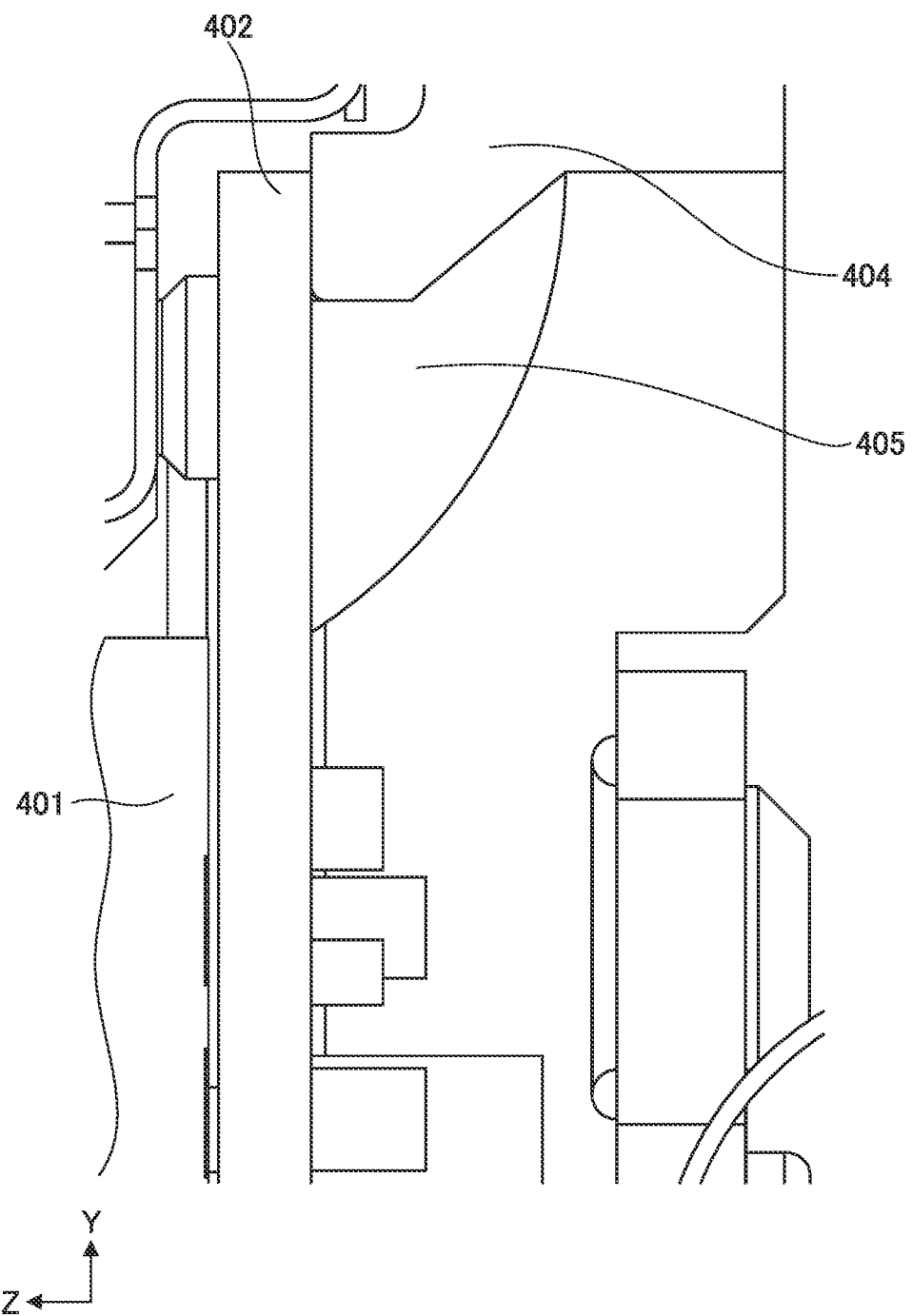
FIG. 6 is a partially enlarged view of FIG. 5.

FIG. 5 is a vertical cross-sectional view of the imaging unit 400 in a YZ plane. FIG. 6 is a partially enlarged view of a region shown by a broken line in FIG. 5 and shows a region at which the imaging substrate 402 and the holding member 404 are in contact with each other.

The imaging substrate 402 on which the image pickup device 401 is mounted is abutted against the holding member 404 in an optical axis OA direction (the Z direction). As a result, the imaging substrate 402 and the holding member 404 are in close contact with each other. In the above close contact state, an adhesive 405 ejected by a dispenser (not shown) or the like is applied to adhere to both the imaging substrate 402 and the holding member 404. Then, the imaging substrate 402 and the holding member 404 are fixed to each other with the adhesive 405. In the present embodiment, it is possible to cure the adhesive 405 in a short time and to shorten a time required for a bonding step by employing an ultraviolet curable resin as the adhesive 405, for example. The adhesive 405 is not limited to the ultraviolet curable resin, and other materials may be used.

Next, a wiring concerning the imaging substrate 402 will be described.

Figure 7:
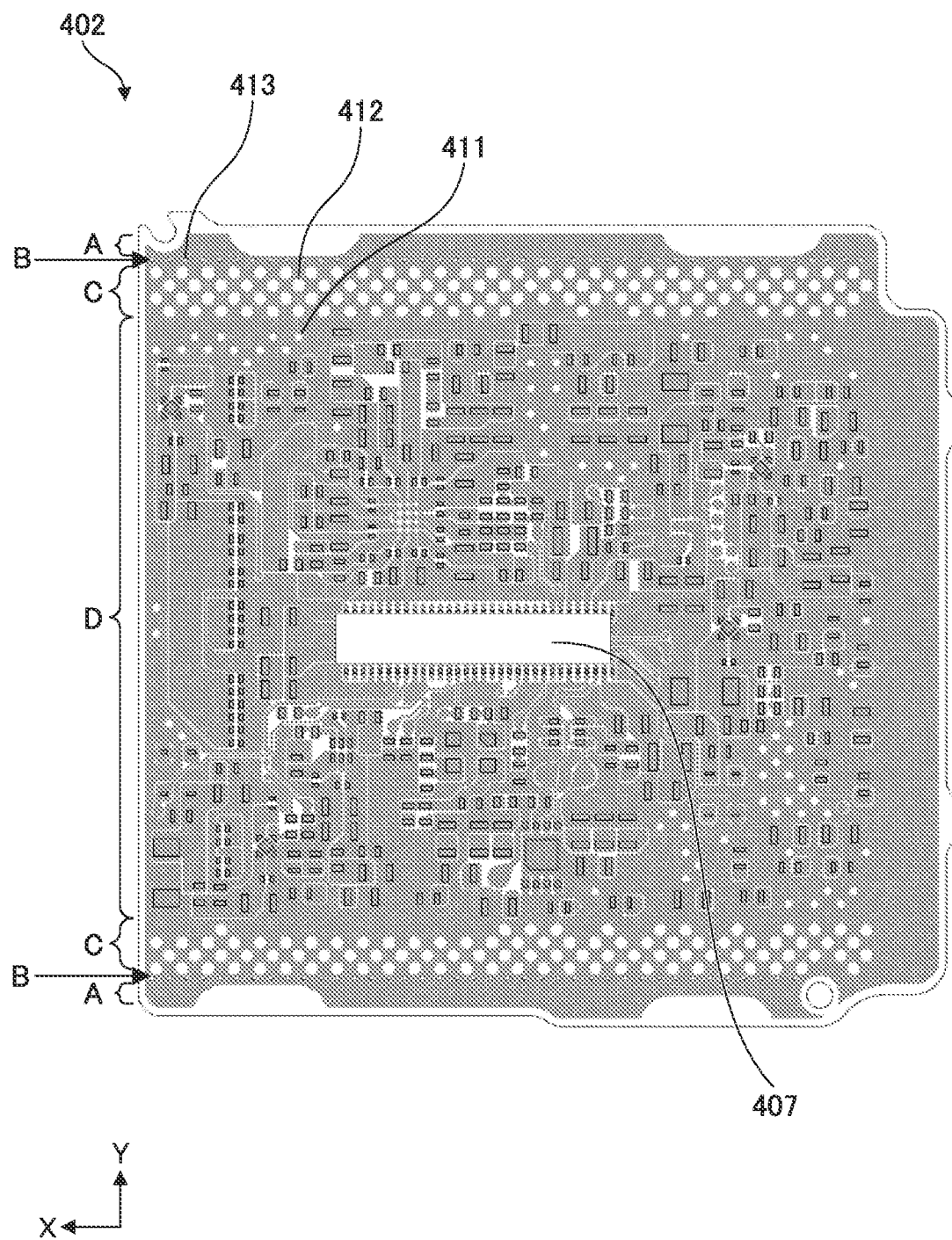
FIG. 7 is a view showing a wiring example of an imaging substrate on a rear surface side.
Figure 8:
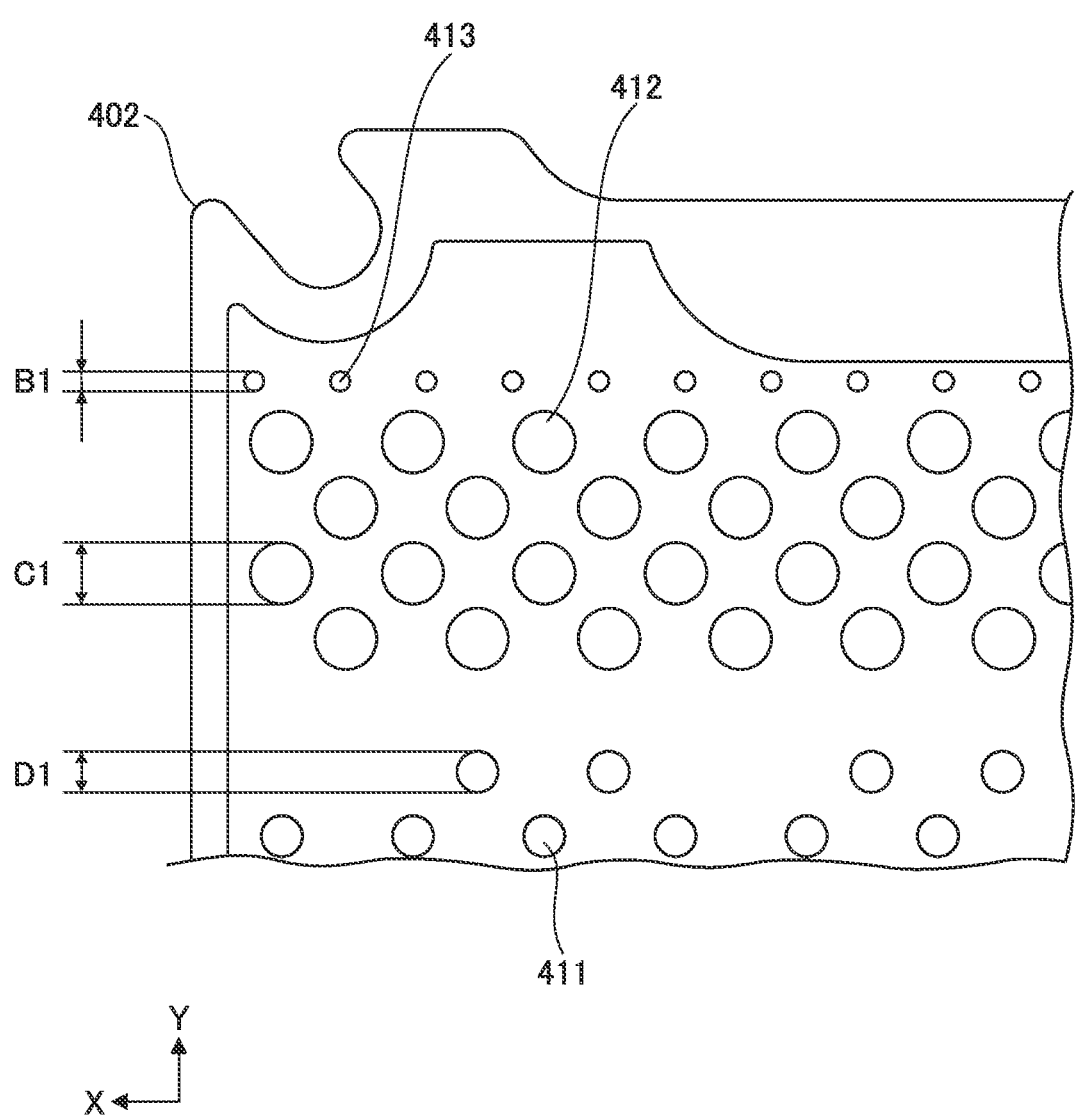
FIG. 8 is a partially enlarged view of FIG. 7.
Figure 9:
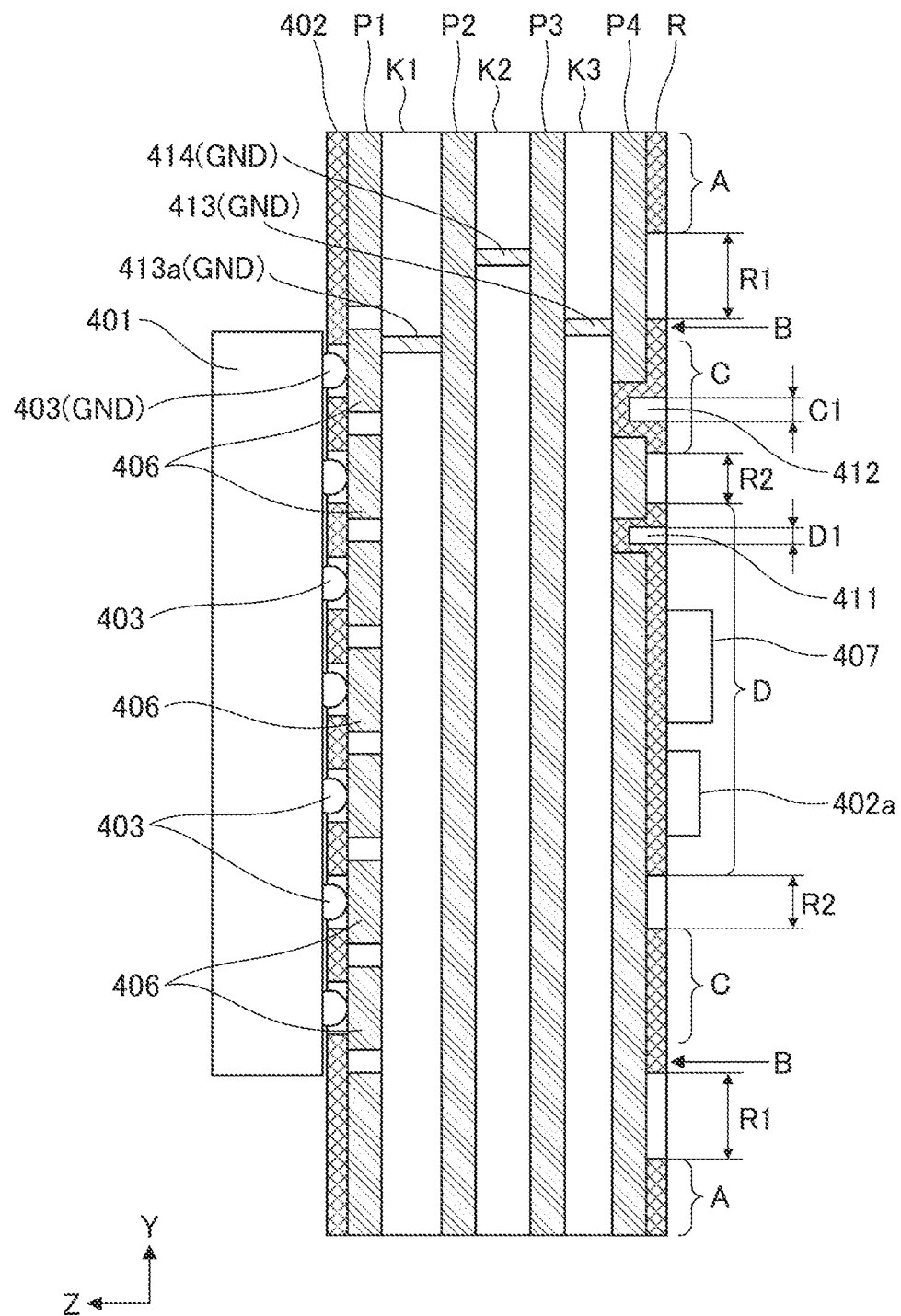
FIG. 9 is a vertical cross-sectional view of the imaging substrate.

FIG. 7 is a view showing a wiring example of the imaging substrate 402 on the rear surface side. FIG. 8 is a partially enlarged view showing a region in which an omission portion is formed in a conductor in FIG. 7. FIG. 9 is a vertical cross-sectional view of the imaging substrate 402 in the YZ plane.

The imaging substrate 402 on which the image pickup device 401 is mounted is a multilayer printed wiring substrate having a substantially rectangular shape as a whole. As shown in FIG. 9, the imaging substrate 402 is configured to have a plurality of conductor layers P1 to Pn and one or more internal insulating layers K1 to K (n−1) (here, n is an integer of 2 or more). Each of the internal insulating layers is disposed between the conductor layers of the imaging substrate 402, and the conductor layers and the internal insulating layers are alternately stacked in the Z direction. Further, a surface insulating layer (a resist) R is formed on a surface of the conductor layer Pn located on the back surface side. FIG. 9 shows a configuration example of the imaging substrate 402 having four conductor layers and three internal insulating layers (that is, n=4).

A plurality of electrode pads 406 are disposed at attachment positions of the image pickup device 401 on the front surface side of the imaging substrate 402. The electrode pads 406 of the imaging substrate 402 are disposed at positions facing the electrode pads 403 on the back surface of the image pickup device 401. When the image pickup device 401 is mounted on the imaging substrate 402, the electrode pads 403 and 406 are connected with solder (not shown), and thus the image pickup device 401 and the imaging substrate 402 are electrically connected. A front surface of the imaging substrate 402 is an example of a first surface.

On the other hand, as shown in FIGS. 7 and 9, a region D on which the various electronic components 402a and the connector 407 are mounted is provided on a rear surface of the imaging substrate 402. The rear surface of the imaging substrate 402 is an example of a second surface which is a surface opposite to the first surface.

The region D of the imaging substrate 402 is located inside the imaging substrate 402 with respect to a region C which will be described later. In the region D, in order to suppress warpage of the imaging substrate 402, conductor omission portions 411 from each of which the conductor layer of the imaging substrate 402 is partially removed are appropriately formed.

Each of the conductor omission portions 411 is a columnar recess having a diameter D1 which is provided in the conductor layer Pn on the rear surface side. As shown in FIG. 9, the surface of each of the conductor omission portions 411 is covered with the surface insulating layer R. By providing the conductor omission portions 411 in the conductor layer Pn, a deformation margin of the conductor layer Pn in a plane direction (an XY direction) of the substrate is increased by spaces of the conductor omission portions 411. As a result, an internal stress of the imaging substrate 402 due to thermal expansion and contraction of the conductor layer Pn can be released, and thus the imaging substrate 402 is less likely to warp. Each of the conductor omission portions 411 is an example of a first recess.

Here, when the conductor omission portions 411 are provided at a portion where the electronic components 402a are mounted, a shape of the solder applied on the cut out conductor becomes non-uniform, which makes it difficult to mount the electronic components 402a. Therefore, in order to suppress an adverse effect on the mounting of the electronic components 402a, the conductor omission portions 411 are provided to avoid the portion of the region D on which the various electronic components 402a are mounted.

Further, as shown in FIG. 7, the region C extending in a band shape along the X direction is provided on the outside of the imaging substrate 402 (an outer edge side of the substrate) in the Y direction with respect to the region D. The region C is an example of a first region and is a region where the imaging substrate 402 and the adhesive 405 are in contact with each other. In the region C, conductor omission portions 412 from each of which the conductor layer of the imaging substrate 402 is partially removed are appropriately formed.

Each of the conductor omission portions 412 is a columnar recess having a diameter C1 which is provided in the conductor layer Pn on the rear surface side. As shown in FIG. 9, the surface of each of the conductor omission portions 412 is covered with the surface insulating layer R. Here, a diameter C1 of each of the conductor omission portions 412 is set to be larger than the diameter D1 of each of the conductor omission portions 411 (C1>D1).

By increasing the diameter C1 of each of the conductor omission portions 412, a space of the recess formed on a substrate surface of the region C is increased, and the contact area with the adhesive 405 is also increased. As a result, when the adhesive 405 is applied to the region C, an application amount of the adhesive 405 can be increased by the conductor omission portions 412. Then, since the imaging substrate 402 and the holding member 404 are more firmly adhered to each other via the adhesive 405, it is possible to prevent the adhesion between the imaging substrate 402 and the holding member 404 from being lowered even when the electronic apparatus is dropped, for example.

Further, as shown in FIG. 7, a region B having a plurality of conductive vias 413 is provided on the outside of the imaging substrate 402 (an outer edge side of the substrate) in the Y direction with respect to the region C. The region B is an example of a second region, and each of the conductive vias 413 is an example of the conductive portion.

As shown in FIG. 8, the plurality of conductive vias 413 in the region B are disposed at regular intervals in the X direction. Further, as shown in FIG. 9, the conductive vias 413 penetrate the internal insulating layer in the imaging substrate 402 and connect the conductor layers. In the example of FIG. 9, the conductive vias 413 penetrate the internal insulating layer K3 and connect the conductor layers P3 and P4. Each of the conductive vias 413 has a columnar shape having a diameter B1, and the inside thereof is filled with a conductor by a copper plating process in order to allow conduction between the outer conductor layer P4 and the inner conductor layer P3 of the imaging substrate 402.

Further, as shown in FIG. 9, conductive vias 413a and conductive vias 414 are arranged in the imaging substrate 402. The conductive vias 413a penetrate the internal insulating layer K1 and connect the conductor layers P1 and P2. Further, the conductive vias 414 penetrate the internal insulating layer K2 and connect the conductor layers P2 and P3.

Here, the conductive vias 413a are connected to a ground signal line GND of the image pickup device 401 via the conductor layer P1 located on a mounting surface side of the image pickup device 401. A ground signal of the image pickup device 401 is transmitted via the conductor layer P2, the conductive vias 414, and the conductor layer P3 of the imaging substrate 402 and reaches the conductor layer P4 via the conductive vias 413 formed in the region B. In general, the ground signal line GND is configured such that a cross-sectional area of the conductor is wider than that of a signal line for transmitting other signals. Therefore, the amount of heat transferred from the image pickup device 401 via the ground signal line GND becomes large.

Here, it is preferable that dimensions of the diameter B1 of each of the conductive vias 413, the diameter C1 of each of the conductor omission portions 412, and the diameter D1 of each of the conductor omission portions 411 be set such that B1<D1<C1. This is because if the diameter B1 of each of the conductive vias 413 is made larger than the diameter D1 of each of the conductor omission portions 411, the effect of suppressing the warpage of the substrate by the conductor omission portions 411 is reduced.

Further, as shown in FIG. 7, a region A is provided on the outside of the imaging substrate 402 (an outer edge side of the substrate) in the Y direction with respect to the region B. The region A is an example of the third region and has a configuration in which the heat of the image pickup device 401 is transferred through the conductive vias 413 provided in the adjacent region B.

The region A is a region having a flat conductor pattern without the conductive vias and omission of a conductor pattern. When the region A is flattened, a contact area with a portion of the holding member 404 facing the region A becomes large. As a result, the heat of the imaging substrate 402 is easily transferred to the holding member 404, and thus heat dissipation of the image pickup device 401 can be efficiently performed.

Further, as shown in FIG. 9, a groove-shaped resist step R1 is formed in the surface insulating layer R between the region A and the region B. Similarly, a groove-shaped resist step R2 is formed in the surface insulating layer R between the region C and the region D. For example, the resist steps R1 and R2 are formed by cutting out the surface insulating layer R in a groove shape, each having a predetermined width in the Y direction and extending in the X direction.

Here, the resist step R1 formed between the region A and the region B is an example of a first groove and functions as a space for an adhesive pool when the adhesive 405 protrudes from the region C. Since the resist step R1 functions as the adhesive pool, it becomes difficult for the adhesive to flow between the substrate and the holding member, and deterioration of the heat dissipation performance due to rising up between the substrate and the holding member is suppressed. Further, the resist step R2 formed between the region C and the region D is an example of a second groove and has a function of making it difficult for the adhesive 405 of the region C to adhere to the electronic components 402a.

Further, it is preferable that groove widths of the resist steps R1 and R2 in the Y direction be set such that R1>R2. According to the above configuration, for example, if the adhesive 405 applied to the region C protrudes, the adhesive 405 tends to flow toward the narrow resist step R2 due to a capillary action. Therefore, the adhesive applied to the region C is more likely to protrude in a direction of the region D than the region A. Therefore, the adhesive 405 entering between the imaging substrate 402 and the holding member 404 and deterioration in performance of heat dissipation from the imaging substrate 402 to the holding member 404 are better curbed.

Even if the adhesive 405 flows into the region D, the adhesive 405 remains in the region D to such an extent as to reduce the reworkability of the components, and thus no major adverse effect occurs. Further, by reducing the groove width of the resist step R2, it is possible to further increase an area of the region D for mounting the electronic components 402a.

In the present embodiment, as shown in FIG. 7, an example in which a combination of the regions A, B, and C is provided on the two upper and lower sides of the imaging substrate 402, and the adhesive 405 is applied to the two upper and lower sides of the imaging substrate 402 is shown. However, the adhesive 405 may be applied by providing the combination of the regions A, B, and C on the two left and right sides or the four top, bottom, left, and right sides of the imaging substrate 402.

As described above, the camera 100 of the present embodiment includes the imaging substrate 402 having the first surface on which the image pickup device 401 is mounted, and the holding member 404 that adheres to the second surface of the imaging substrate 402 to hold the imaging substrate 402. The second surface of the imaging substrate 402 includes the region A, the region B, and the region C. The holding member 404 is fixed to the region C via the adhesive 405. The conductive vias 413 that guide the heat of the image pickup device 401 from the first surface to the second surface of the imaging substrate 402 are disposed in the region B. In the region A, a portion of the holding member 404 and the imaging substrate 402 come into contact with each other. Then, the region B is provided between the region C and the region A in a plane direction of the second surface.

In the camera 100 of the present embodiment, the imaging substrate 402 and the holding member 404 are fixed with the adhesive 405 in the region A. Further, in the camera 100 of the present embodiment, the region B in which the conductive vias 413 are disposed is provided between the above region C and the region A in which a portion of the holding member 404 and the imaging substrate 402 come into contact with each other. As a result, the heat from the image pickup device 401 is transferred from the region A to the holding member 404 through the conductive vias 413 of the region B, and thus the heat from the image pickup device 401 is efficiently transferred to the holding member 404 without passing through the adhesive 405.

Figure 10:
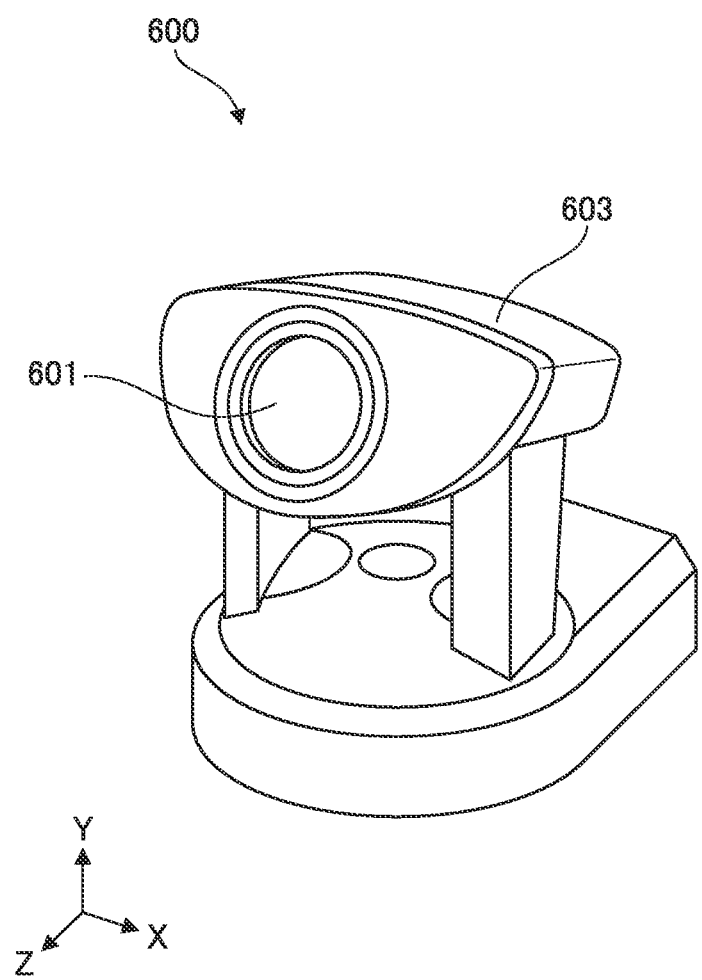
FIG. 10 is an external view of a network camera.
Figure 11:
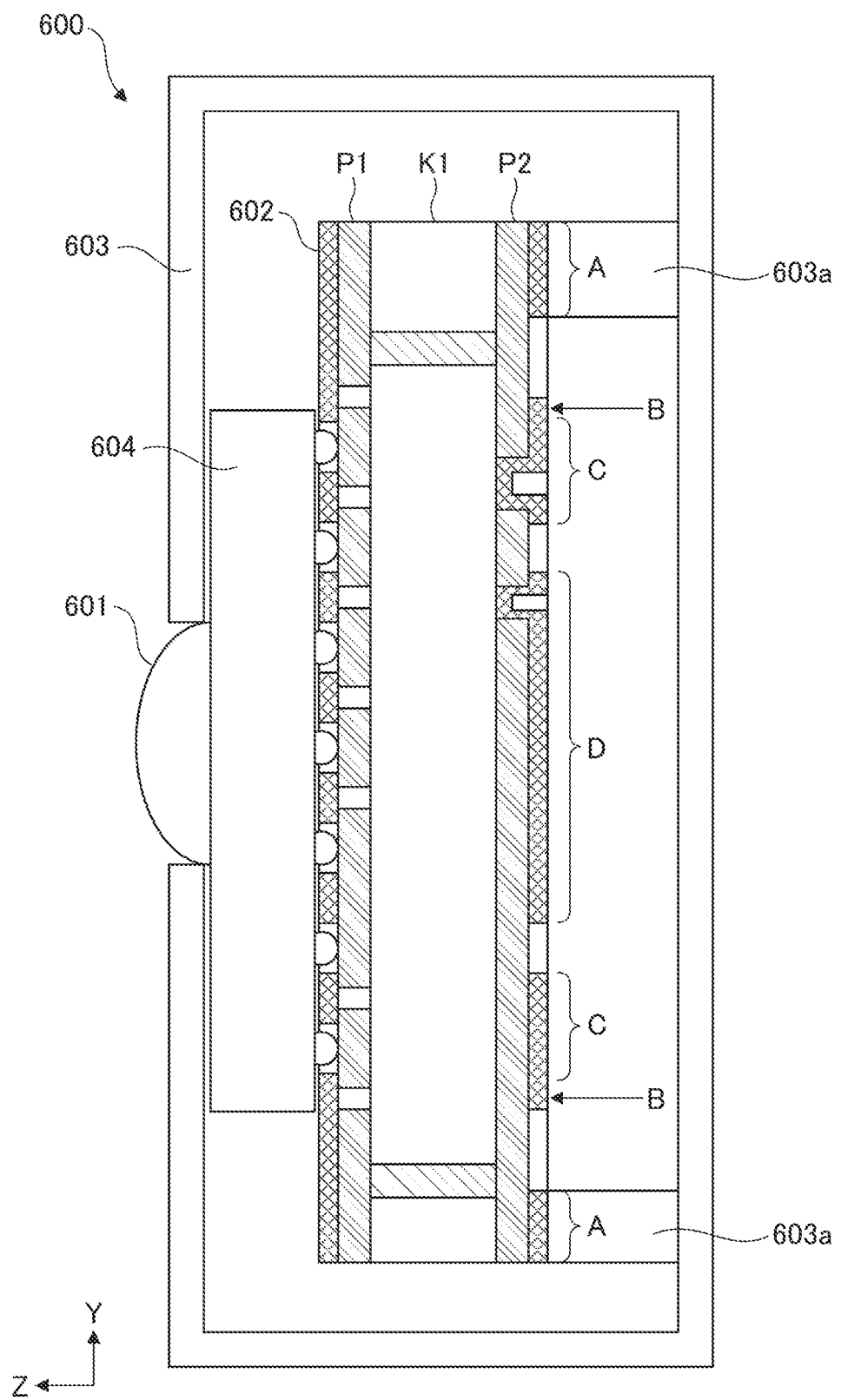
FIG. 11 is a cross-sectional view showing an example of an internal configuration of the network camera.

Further, a network camera, which is another example of the electronic apparatus, will be described with reference to FIGS. 10 and 11. FIG. 10 is an external view of a network camera. FIG. 11 is a cross-sectional view showing an example of an internal configuration of the network camera.

The network camera 600 includes a lens unit 601 for imaging a subject and a substrate 602 on which the lens unit 601 including an image pickup device 604 is mounted, and these elements are housed in and covered with an exterior member 603. FIG. 11 shows a configuration example of a two-layer substrate in which an insulating layer K1 is formed as one layer and conductor layers P1 and P2 are formed on front and back surfaces of the insulating layer K1 as the substrate 602 of the network camera 600 for simplification.

In the network camera 600, as shown in FIG. 11, a substrate support portion 603a, which is a portion of the exterior member 603, is in direct contact with a region A of the substrate 602. Other configurations related to the substrate are the same as in the case of the camera 100 described above.

In the network camera 600 shown in FIG. 11, since the exterior member 603 functions as a holding member, the electronic apparatus can be easily miniaturized and thinned as compared with the case where the exterior member and the holding member are separate components. Further, in the configuration of the network camera 600 shown in FIG. 11, since the heat generated by the image pickup device 604 is released to the outside via the exterior member 603, cooling performance of the image pickup device 604 can be improved.

In the above, the preferred embodiments of the present invention have been described, however the present invention is not limited to these embodiments, and various modifications and changes can be made within the scope of the gist thereof.

For example, the imaging unit of the above embodiment may be a camera module mounted on a portable electronic apparatus such as a smartphone or a mobile computer terminal.

Further, for example, in the above embodiment, the case where the semiconductor element mounted on the substrate is the image pickup device has been described, but the semiconductor element may be other than the image pickup device. As an example, the semiconductor element mounted on the substrate may be a light emitting element such as an LED or an organic EL, an integrated circuit such as a processor, a memory, or the like.

Further, the shape of the conductor omission portion and the conductive via in the plane direction in the above embodiment is not limited to a circle and may be another shape such as a rectangle or an ellipse.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-000390, filed Jan. 5, 2021 which is hereby incorporated by reference wherein in its entirety.

What is claimed is:

1. An electronic apparatus comprising:
   a substrate having a first surface on which a semiconductor element is mounted; and
   a holding member configured to adhere to a second surface of the substrate which is a surface opposite to the first surface and to hold the substrate,
   wherein the second surface of the substrate includes
   a first region to which the holding member is fixed via an adhesive,
   a second region in which a conductive portion that conducts heat of the semiconductor element from the first surface to the second surface of the substrate is disposed, and
   a third region at which a portion of the holding member and the substrate come into contact with each other, and
   wherein the second region is provided between the first region and the third region in a plane direction of the second surface.

2. The electronic apparatus according to claim 1, wherein the semiconductor element is an image pickup device.

3. The electronic apparatus according to claim 1, wherein the holding member is formed of a metal material.

4. The electronic apparatus according to claim 1, wherein the conductive portion of the second region is connected to a ground signal line of the semiconductor element.

5. The electronic apparatus according to claim 1, wherein a combination of the first region, the second region, and the third region is provided on at least two sides of the substrate.

6. The electronic apparatus according to claim 1, wherein the third region is disposed on an outer edge side of the substrate with respect to the second region adjacent thereto.

7. The electronic apparatus according to claim 6, wherein a first groove is formed between the third region and the second region.

8. The electronic apparatus according to claim 7,
   wherein a second groove is formed inside the substrate with respect to the first region, and
   wherein a groove width of the second groove is smaller than a groove width of the first groove.

9. The electronic apparatus according to claim 6,
   wherein a first recess configured to suppress warpage of the substrate is formed in a region located inside the substrate with respect to the first region, and
   wherein a dimension of the first recess in the plane direction is larger than a dimension of the conductive portion in the plane direction.

10. The electronic apparatus according to claim 9,
    wherein a second recess is formed in a surface of the first region to increase a contact area with the adhesive, and
    wherein a dimension of the second recess in the plane direction is larger than a dimension of the first recess in the plane direction.

* * * * *